(12) United States Patent
Ganti et al.

(10) Patent No.: US 7,759,915 B2
(45) Date of Patent: Jul. 20, 2010

(54) SYSTEM WITH LINEAR AND SWITCHING REGULATOR CIRCUITS

(75) Inventors: Ramkishore Ganti, Dripping Springs, TX (US); Caiyi Wang, Austin, TX (US); Augusto M. Marques, Austin, TX (US)

(73) Assignee: ST-Ericsson SA, Geneva (CH)

( * ) Notice: Subject to any disclaimer, the term of this patent is extended or adjusted under 35 U.S.C. 154(b) by 111 days.

(21) Appl. No.: 11/362,982

(22) Filed: Feb. 27, 2006

(65) Prior Publication Data
US 2007/0200539 A1    Aug. 30, 2007

(51) Int. Cl.
*G05F 1/00* (2006.01)
(52) U.S. Cl. ..................................... 323/268
(58) Field of Classification Search .................. 323/268, 323/272, 273, 275, 277, 282, 224
See application file for complete search history.

(56) References Cited

U.S. PATENT DOCUMENTS

| | | | | |
|---|---|---|---|---|
| 5,058,373 A | * | 10/1991 | Moore | 60/39.27 |
| 5,216,351 A | * | 6/1993 | Shimoda | 323/224 |
| 5,525,895 A | * | 6/1996 | Fishman | 323/268 |
| 5,592,072 A | * | 1/1997 | Brown | 323/268 |
| 5,672,952 A | * | 9/1997 | Szepesi | 320/164 |
| 5,969,512 A | * | 10/1999 | Matsuyama | 323/272 |
| 6,031,362 A | * | 2/2000 | Bradley | 323/269 |
| 6,223,080 B1 | * | 4/2001 | Thompson | 607/16 |
| 6,586,911 B1 | * | 7/2003 | Smith et al. | 320/134 |
| 6,661,210 B2 | * | 12/2003 | Kimball et al. | 323/268 |
| 6,661,211 B1 | * | 12/2003 | Currelly et al. | 323/268 |
| 6,856,654 B1 | * | 2/2005 | Carkner et al. | 375/295 |
| 7,057,378 B2 | * | 6/2006 | Oyama et al. | 323/268 |
| 7,129,681 B2 | * | 10/2006 | Fujii | 323/268 |
| 7,131,018 B2 | | 10/2006 | Ueda | |

FOREIGN PATENT DOCUMENTS

JP          11265225 A   *   9/1999

OTHER PUBLICATIONS

"Application Note 2997 Basic Switching-Regulator-Layout Techniques", Dallas Semiconductor Maxim, Internet Dec. 19, 2005, http://www.maxim-ic.com/appnotes.fcm/appnote_number/2997.

"Application Note 2031 DC-DC Converter Tutorial", Dallas Semiconductor Maxim, Internet Dec. 19, 2005, http://www.maxim-ic.com/appnotes.cfm/appnote_number/2031.

(Continued)

*Primary Examiner*—Bao Q Vu
*Assistant Examiner*—Jue Zhang
(74) *Attorney, Agent, or Firm*—William J. Kubida; Scott J. Hawranek; Hogan Lovells US LLP

(57) ABSTRACT

An apparatus comprises a circuit having a power supply node and a linear regulator configured to provide a regulated voltage at the power supply node of the circuit. The apparatus further comprises a switching regulator configured to provide input power to the linear regulator from a power source such as a battery. In some implementations, the circuit is a transceiver circuit.

16 Claims, 3 Drawing Sheets

OTHER PUBLICATIONS

"Switching Regulator Basics", Martell, Internet Dec. 2, 2005, http://www.rason.org/projects/swregdes/swregdes.html.

"Switching Regulators", National Semiconductor, Internet May 2000, http://www.national.com/appinfo/power/files/f5.pdf.

"Op-Amp Based Linear Regulators", Internet Dec. 2, 2005, http://tangentsoft.net/elec/opamp-linreg.html.

"Micrel Launches MIC2224, New High Frequency PWM Switching Regulator for Next Generation Mobile Phones", ThomasNet Industrial News Room, Internet Feb. 8, 2005, http://news.thomasnet.com/fullstory/460181.

"Power Supply Circuits", All About Circuits, vol. 3, Ch. 9, Internet Dec. 2, 2005, http://www.allaboutcircuits.com/vol_3/chpt_9/1.html.

"Linear and Switching Voltage Regulator Fundamentals", Simpson, National Semiconductor, Internet May 2000, http://www.national.com/appinfo/power/files/f4.pdf.

* cited by examiner

SYSTEM WITH LINEAR AND SWITCHING REGULATOR CIRCUITS

BACKGROUND OF THE INVENTION

1. Field of the Invention

This invention relates to power supply regulation and, more particularly, to the regulation of power supplied to sensitive analog circuitry.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to base band and/or up-convert a base band signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often important to minimize noise and interference from sources external or even internal to the communication apparatus.

One source of noise that may adversely affect operation of the RF front-end circuitry is power supply noise. Power supply noise can originate from noisy digital circuits internal to an integrated circuit chip or can come from components such as battery or regulators external to the chip. Power supply noise may be a particular problem, for example, in systems that also include digital circuitry (such as digital base band circuitry), since significant amounts of noise may be induced at the power supply node due to clocking of the digital circuitry.

To reduce the adverse affects of power supply noise on the sensitive analog circuitry, some communication apparatus therefore employ linear regulator circuits to regulate the power provided from the power supply to the analog circuitry. While this arrangement may greatly improve the negative effects of power supply noise on the operation of the analog circuitry, unfortunately, the linear regulator circuit may consume relatively large amounts of power. In the designs of many systems and particularly in battery powered systems, it is a significant goal and challenge to minimize power consumption.

SUMMARY OF THE INVENTION

Various embodiments of systems with linear and switching regulator circuits are disclosed. In one embodiment, an apparatus comprises a circuit having a power supply node and a linear regulator configured to provide a regulated voltage at the power supply node of the circuit. The apparatus further comprises a switching regulator configured to provide input power to the linear regulator from a power source such as a battery. In some implementations, the circuit is a transceiver circuit.

In another embodiment, a communication device comprises an analog transceiver circuit, a battery, and a switching regulator coupled to receive input power from the battery. A linear regulator is coupled to provide power from the switching regulator to the analog transceiver circuit.

Figure 1:
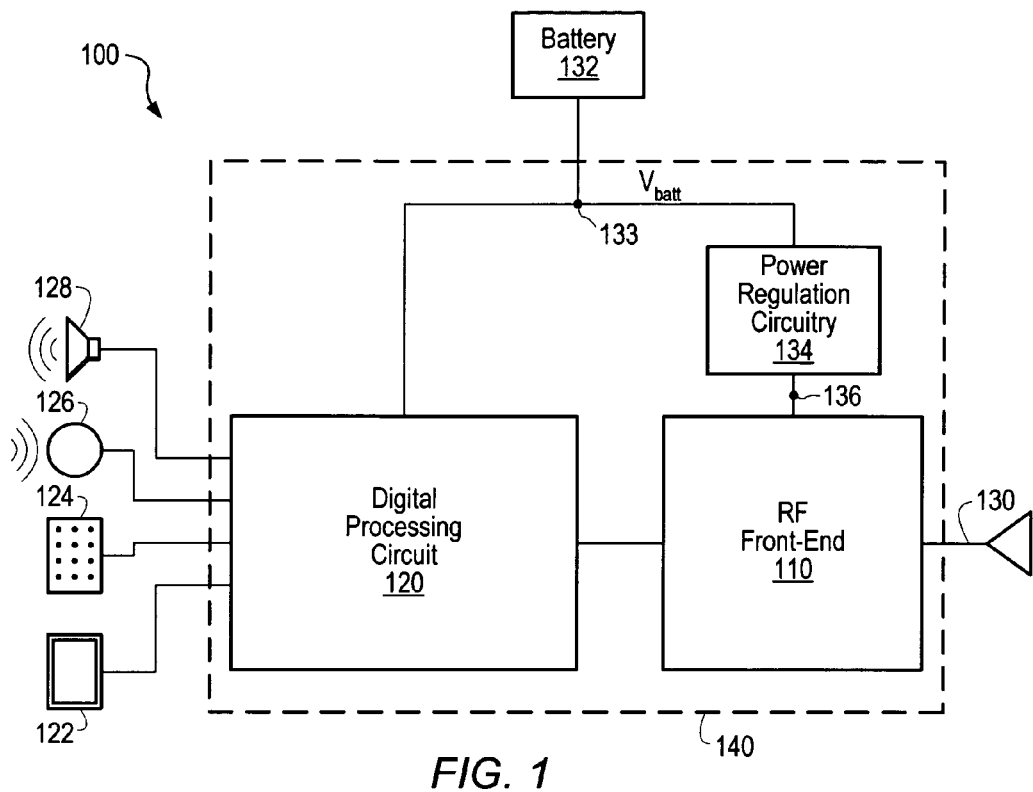
FIG. 1 is a block diagram of one embodiment of a communication apparatus including an RF front-end.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. It is noted that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Turning now to FIG. 1, a generalized block diagram of a communication apparatus 100 is shown. In the depicted embodiment, communication apparatus 100 includes a radio frequency (RF) front-end circuit 110 coupled to a digital processing circuit 120. Various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components not shown in FIG. 1 and/or exclude one or more of the illustrated components, depending on the desired functionality.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3 G, satellite communications, and the like. As such, communication apparatus 100 may provide RF transceiver functionality.

The communication apparatus 100 may be configured to implement one or more specific communication protocols or standards, including protocols in which transmission and reception operations occur concurrently. For example, in one embodiment, the communication apparatus 100 may implement WCDMA. It is noted however that in other embodiments the communication apparatus 100 may implement other communication protocols, for example, CDMA (Code-Division Multiple Access).

RF front-end circuit 110 includes analog transceiver circuitry operable to transmit and receive RF signals. As such, RF front-end circuit 110 may up-convert a signal from digital processing circuit 120 to an RF frequency for transmission, and may down-convert a received RF signal to a lower frequency (e.g., base band) for subsequent processing by digital processing circuit 120.

Digital processing circuit 120 may provide a variety of signal processing functions, as desired, including base band functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown in FIG. 1), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In the depicted embodiment, a battery 132 is provided as a source of power for powering the circuitry forming communication apparatus 100. For example, digital processing circuit 120 may be powered by battery 132 via a connection at node 133. As will be described in further detail below, power regulation circuitry 134 may be coupled to regulate the power provided from battery 132 at node 133 to thereby generate a regulated voltage at a node 136 from which power to RF front-end circuit 110 is provided. The regulated voltage may be generated such that any power supply noise present at node 133 is substantially filtered.

In one embodiment, RF front-end circuit 110 and digital processing circuit 120 may be integrated on the same integrated circuit die 140. In other embodiments, RF front-end circuit 110 and digital processing circuit 120 may be implemented on separate integrated circuits. It should be noted that the components described with reference to FIG. 1 are meant to be exemplary only, and are not intended to limit the invention to any specific set of components or configurations.

Figure 2:
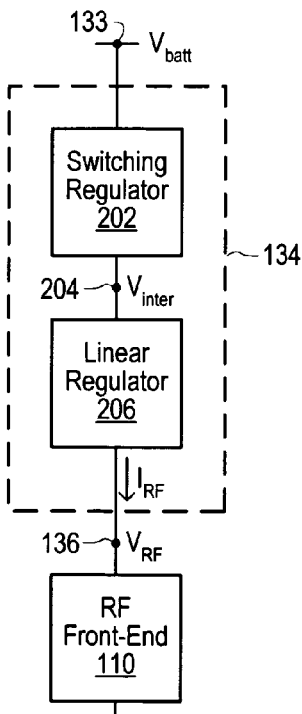
FIG. 2 is a block diagram illustrating aspects of power regulation circuitry.

FIG. 2 is a block diagram illustrating further aspects of power regulation circuitry 134. In the depicted embodiment, power regulation circuitry 134 includes a switching regulator 202 coupled to receive battery power at node 133 and to provide an intermediate voltage $V_{inter}$ at node 204. A linear regulator 206 is in turn coupled to receive power output from switching regulator 202 at node 204 and to provide a regulated voltage $V_{RF}$ at node 136 for powering RF front-end circuit 110.

Figure 3:
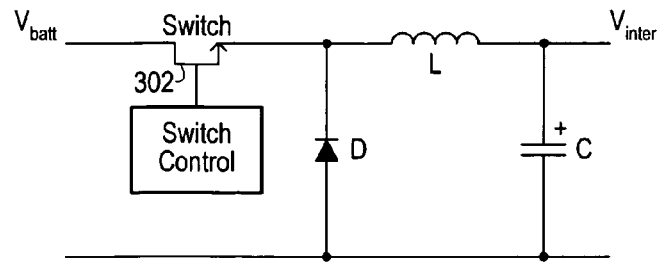
FIG. 3 is a circuit diagram illustrating an exemplary configuration of a switching regulator.

Switching regulator 202 may be implemented according to any of a variety of specific switching regulator circuit configurations, such as the basic buck converter topology as illustrated in FIG. 3. In general, a switching regulator is a regulator circuit that employs a switch to control the transfer of energy from input to output. As illustrated in the exemplary configuration of FIG. 3, the switch may be implemented using a transistor 302, and a switch control circuit may be used to turn on and off the transistor at a fixed or varying frequency. Efficiencies attained by typical switching regulator circuits may be between 80% to 95% or greater. It is noted that the basic switching regulator configuration as illustrated in FIG. 3 is purely exemplary, and that numerous other specific circuit implementations of switching regulator circuit 202 are possible.

Figure 4A:
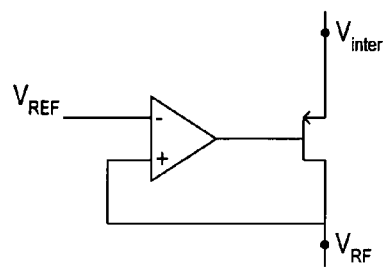
FIGS. 4A and 4B are circuit diagrams illustrating exemplary configurations of linear regulators.
Figure 4B:
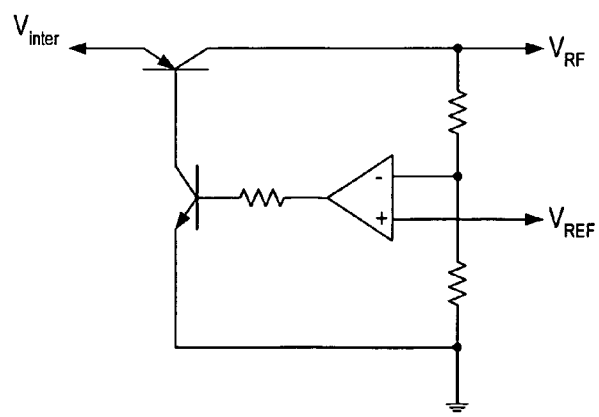

Linear regulator 206 may likewise be implemented according to a variety of specific linear regulator circuit configurations such as, for example, the basic circuit configurations illustrated in FIGS. 4A and 4B. In general, a linear regulator is a regulator circuit that employs a resistive voltage drop to regulate output voltage. The resistive voltage drop is typically achieved using a transistor operating in its active mode. In one embodiment, linear regulator 206 is implemented using a low dropout (LDO) regulator circuit. It is noted that the linear regulator circuit configurations illustrated in FIGS. 4A and 4B are also purely exemplary, and that numerous other specific circuit implementations of linear regulator 206 are possible.

It may be observed in the operation of the circuit arrangement of FIG. 2 that the intermediate voltage $V_{inter}$ generated by switching regulator 202 at node 204 may be relatively noisy due to the switching of switching regulator 202. However, linear regulation 206 may filter much of this noise and any other power supply noise to provide a relatively quiet voltage $V_{RF}$ for powering the analog circuitry of RF front-end circuit 110. In addition, since a switching regulator 202 (which has a relatively high efficient) is employed to step down the battery voltage $V_{batt}$ to an intermediate voltage $V_{inter}$ prior to further regulation by linear regulator 206, relatively low power consumption may be attained.

In particular, consider the specific situation in which RF front-end circuit is implemented in CMOS technology requiring an operating voltage $V_{RF}$ of approximately 1.2 volts, and in which battery 132 generates a voltage $V_{batt}$ of 3.6 volts. In such a situation, if power regulation circuitry 134 were implemented in a traditional fashion using solely a linear regulator, the total power consumption dissipated by battery 132 (not taking into account other circuitry which is not illustrated in FIG. 2) would be:

$$\text{Power Consumption}_{battery} = V_{batt} * I_{RF}$$

where $I_{RF}$ is the amount of current drawn by RF front-end circuit 110.

In contrast, by using the configuration of power regulation circuitry 134 as illustrated in FIG. 2 wherein switching regulator 202 is interposed between battery 132 and linear regulator circuit 206, a relatively smaller amount of power may be consumed. More specifically, the total power consumption dissipated by battery 132 for the configuration of FIG. 2 would be:

$$\text{Power Consumption}_{battery} = \left(\frac{V_{inter} * I_{RF}}{\eta}\right)$$

where $\eta$ is the percent efficiency of switching regulator circuit 134.

Thus, by way of example, if:
$V_{batt}$=3.6 volts
$V_{inter}$=1.8 volts and
$\eta$=90%, the percentage of power dissipated by the circuit configuration of FIG. 2 as compared to the traditional approach would be:

$$\frac{V_{inter}}{\eta * V_{batt}} = \frac{1.8}{0.9 * 3.6} = 55\%$$

The power regulation circuitry of FIG. 2 may accordingly provide power with relatively low power supply noise to RF front-end circuit 110, while consuming less power in comparison to traditional approaches.

Figure 5:
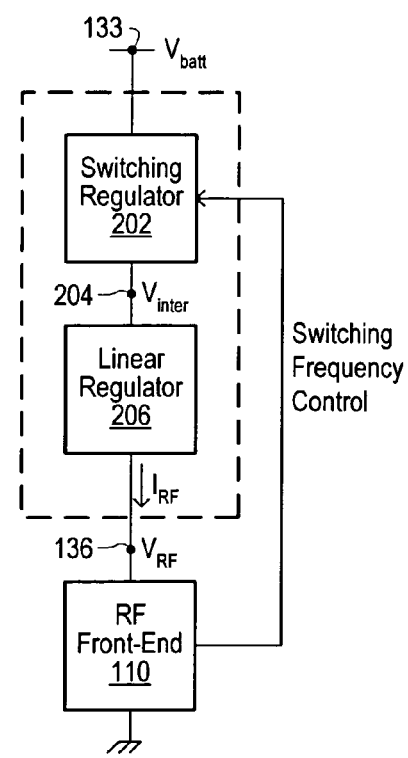
FIG. 5 is a block diagram illustrating an alternative embodiment of power regulation circuitry.

It is noted that variations in the configuration of the circuitry as illustrated in FIG. 2 are also possible. For example, FIG. 5 illustrates an embodiment wherein the switching frequency (or "chopping" frequency) of switching regulator 202 is controlled according to an operating mode of RF front-end circuit 110. In particular, in one specific implementation, the switching frequency of switching regulator 202 may be varied based upon the frequency of operation of RF front-end circuit 110 and/or based upon whether RF front-end circuit 110 is operating in a transmission mode or in a reception mode. The switching frequency may be chosen in such a way that any spurious content at node 136 (e.g., including noise caused by switching regulator 202 that is not filtered by linear regulator 206) is at a frequency that will have the least (or an acceptable) impact upon the performance of RF front-end circuit 110.

It is further noted that in some embodiments, RF front-end circuit 110 and linear regulator circuit 206 may be integrated on a common integrated circuit die. In yet other embodiments, RF front-end circuit 110, linear regulator 206, and switching regulator 202 may all be incorporated on a common integrated circuit die. In addition, while a battery is used as a power source in the embodiments described above, other power sources may be employed in some alternative embodiments.

Figure 6:
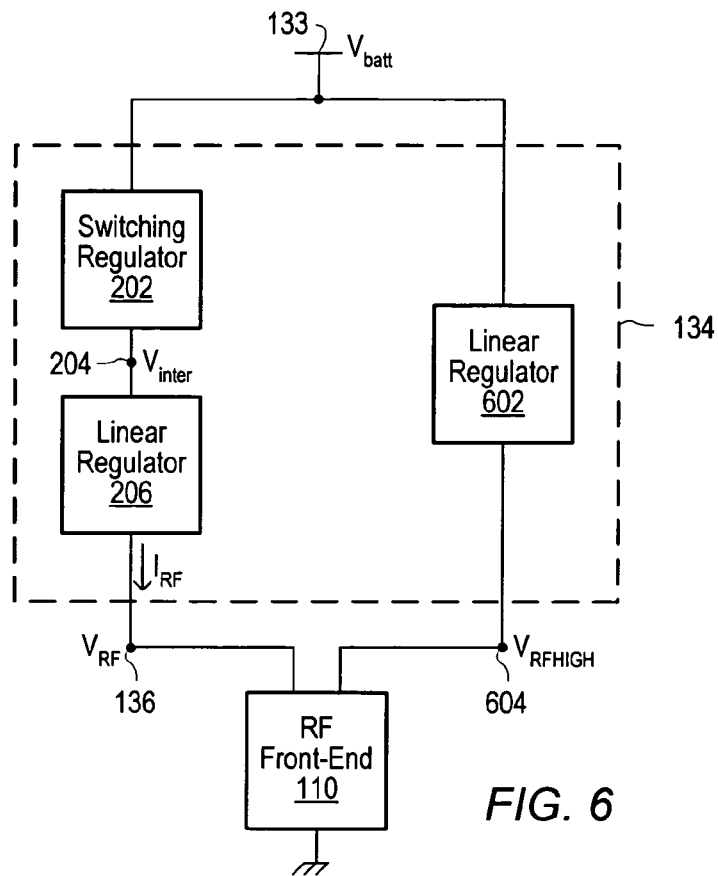
FIG. 6 is a block diagram illustrating another alternative embodiment of power regulation circuitry.

Turning next to FIG. 6, a block diagram illustrating another alternative embodiment of power regulation circuitry 134 is shown. In the embodiment of FIG. 6, RF front-end circuit 110 includes a first portion of circuitry that receives power through node 136 at a voltage $V_{RF}$, such as 1.2 volts, and another portion of circuitry that receives power through a node 604 at a higher voltage $V_{RFHIGH}$, such as 2.85 volts (it is noted that the functionality of these different portions of circuitry would depend upon the specific implementation of RF front-end circuit 110, and might vary significantly from design to design, as desired). As shown, in addition to switching regulator 202 and linear regulator 206 that operate to provide the voltage $V_{RF}$, a linear regulator 602 is coupled to receive battery power at node 133 and to provide a regulated voltage $V_{RFHIGH}$ at node 604 without an intervening switching regulator. The embodiment as illustrated in FIG. 6 may be particularly desirable for implementations in which the voltage $V_{RFHIGH}$ for powering a portion of the circuitry of RF front-end 110 is set at a relatively high level that would not otherwise accommodate inclusion of an intervening switching regulator circuit (i.e., due to a necessary voltage drop that would otherwise be incurred across such an intervening switching regulator circuit).

Figure 7:
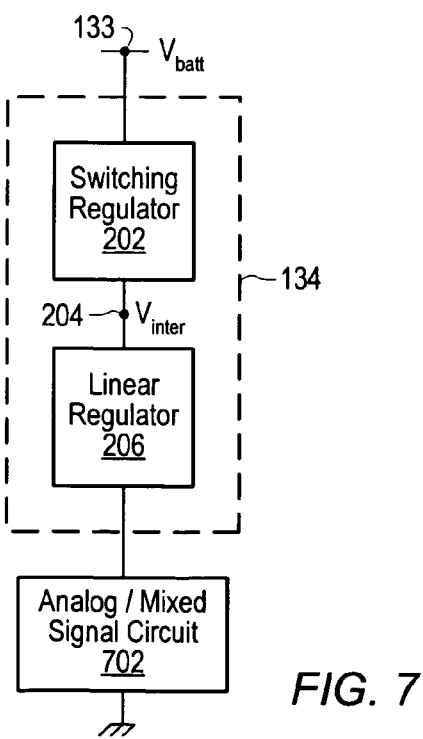
FIG. 7 is a block diagram illustrating power regulation circuitry configured to power an analog/mixed signal circuit.

It is finally noted that while the power regulation circuitry 134 as described above is employed to power the sensitive analog transceiver circuitry of an RF front-end circuit, embodiments are also contemplated in which power regulation circuitry 134 is used to power any other type of circuit, as desired, including mixed signal circuits and digital circuits. FIG. 7 illustrates such a generalized embodiment, wherein the power regulation circuitry 134 as described above is used to power a noise sensitive analog/mixed signal circuit 702. Analog/mixed signal circuit 702 is illustrative of any type of analog and/or mixed signal circuit, and could be configured to perform any particular function, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
    a transceiver circuit having a first portion that receives power through a first power supply node and a second portion that receives power through a second power supply node;
    a first linear regulator configured to receive an intermediate voltage and provide a first regulated voltage at the first power supply node;
    a switching regulator configured to provide the intermediate voltage to the first linear regulator, wherein the intermediate voltage is provided at an intermediate power supply node;
    a second linear regulator configured to provide a second regulated voltage at the second power supply node; and
    a battery coupled to provide a source of power to the switching regulator,
    wherein the first and second linear regulators are configured to substantially minimize noise at the second power supply node, and
    wherein a switching frequency of the switching regulator is dependent upon whether the transceiver circuit is operating in a transmission mode or in a receiving mode.

2. The apparatus as recited in claim 1, wherein the circuit is an analog circuit.

3. The apparatus as recited in claim 1, wherein the circuit is a mixed signal circuit.

4. The apparatus as recited in claim 1, wherein the circuit and the first linear regulator are integrated on a common integrated circuit die.

5. The apparatus as recited in claim 1, wherein the circuit, the first linear regulator and the switching regulator are integrated on a common integrated circuit die.

6. The apparatus as recited in claim 1, wherein the transceiver circuit is a transceiver circuit of a mobile phone.

7. The apparatus as recited in claim 1, wherein a switching frequency of the switching regulator is dependent upon an operating mode of the circuit.

8. The apparatus as recited in claim 1, wherein a switching frequency of the switching regulator is dependent upon a frequency of operation of the circuit.

9. A communication device comprising:
    an analog transceiver circuit; a digital processing circuit coupled to the analog transceiver circuit;
    a battery coupled to the analog transceiver circuit and directly coupled to the digital processing circuit;
    a switching regulator coupled to receive input power from the battery and configured to output an intermediate voltage; and
    a linear regulator coupled to provide power from the switching regulator to the analog transceiver circuit, wherein the switching regulator and linear regulator are configured to substantially minimize noise in power output from the linear regulator with low power consumption by utilizing the intermediate voltage, wherein a switching frequency of the switching regulator is dependent upon whether the transceiver circuit is operating in a transmission mode or in a receiving mode.

10. The communication device as recited in claim 9, wherein the analog transceiver circuit and the linear regulator are integrated on a common integrated circuit die.

11. The communication device as recited in claim 9, wherein the analog transceiver circuit, the linear regulator and the switching regulator are integrated on a common integrated circuit die.

12. The communication device as recited in claim 9, wherein the analog transceiver circuit is configured to implement a mobile phone functionality.

13. The communication device as recited in claim 9, wherein a switching frequency of the switching regulator is dependent upon an operating mode of the analog transceiver circuit.

14. The communication device as recited in claim 9, wherein a switching frequency of the switching regulator is dependent upon a frequency of operation of the analog transceiver circuit.

15. A method of providing power to a circuit, comprising the steps of:

providing source power from a battery at a first voltage;

regulating the source power from the battery through a switching regulator and outputting a second voltage, wherein the second voltage is less than about 50% of the first voltage;

further regulating the second voltage from the switching regulator through a linear regulator; and powering the circuit with power having minimal noise from an output of the linear regulator circuit, wherein the circuit is a radio frequency transceiver circuit, and wherein a switching frequency of the switching regulator is dependent upon whether the transceiver circuit is operating in a transmission mode or in a receiving mode.

16. The method as recited in claim 15, further comprising regulating the source of power from the battery in a parallel electrical path from the battery through a second linear regulator.

* * * * *